United States Patent [19]

Sugiura

[11] Patent Number: 5,126,839
[45] Date of Patent: Jun. 30, 1992

[54] COLOR IMAGE PROCESSING APPARATUS
[75] Inventor: Susumu Sugiura, Yamato, Japan
[73] Assignee: Canon Kabushiki Kaisha, Tokyo, Japan
[21] Appl. No.: 129,365
[22] Filed: Nov. 30, 1987

Related U.S. Application Data

[63] Continuation of Ser. No. 880,935, Jun. 25, 1986, abandoned, which is a continuation of Ser. No. 584,510, Feb. 28, 1984.

[30] Foreign Application Priority Data

Mar. 5, 1983 [JP] Japan ................. 58-36416

[51] Int. Cl.$^5$ ................. G03F 3/08
[52] U.S. Cl. ................. 358/80; 355/327; 355/32; 346/157
[58] Field of Search ................. 358/80, 75, 300; 346/157; 355/208, 35, 38, 326, 327, 32, 88, 77

[56] References Cited

U.S. PATENT DOCUMENTS

| | | | |
|---|---|---|---|
| 3,878,559 | 4/1975 | Pugsley | 358/75 |
| 4,007,489 | 2/1977 | Helmburger et al. | 358/78 |
| 4,106,870 | 8/1978 | Kondo et al. | 355/4 |
| 4,230,405 | 10/1980 | Kurtz | 355/4 |
| 4,323,919 | 4/1982 | Fujii et al. | 358/75 |
| 4,335,398 | 6/1982 | Yamada | 358/80 |
| 4,346,402 | 8/1982 | Pugsley | 355/38 X |
| 4,403,848 | 9/1983 | Snelling | 355/4 |
| 4,469,433 | 9/1984 | Kurata et al. | 355/4 |

FOREIGN PATENT DOCUMENTS

| | | |
|---|---|---|
| 018060 | 10/1983 | European Pat. Off. |
| 109863 | 5/1984 | European Pat. Off. |
| 2321689 | 11/1973 | Fed. Rep. of Germany |
| 2445541 | 4/1976 | Fed. Rep. of Germany |
| 3015396 | 10/1980 | Fed. Rep. of Germany |
| 3020201 | 12/1980 | Fed. Rep. of Germany |
| 0052770 | 5/1981 | Japan ................. 355/4 |
| 0095266 | 6/1981 | Japan ................. 355/4 |
| 0102675 | 6/1982 | Japan ................. 355/4 |
| 0176069 | 10/1982 | Japan ................. 355/4 |
| 0154855 | 9/1983 | Japan ................. 355/4 |
| 1526274 | 9/1978 | United Kingdom |
| 1294536 | 12/1978 | United Kingdom |
| 1535236 | 12/1978 | United Kingdom |
| 2033188 | 5/1980 | United Kingdom |
| 2110045A | 6/1983 | United Kingdom |

OTHER PUBLICATIONS

Pugsley et al., "The Computer and Other Recent Technical Developments in Colour Scanner Technology", Conference Papers of PIRO/RPS, IARIGAI, International Conference of New Developments and Applicaations of Photography in Printing, pp. 33:1 to 33:3 (Apr. 2-14, 1975).
Yule, J. A. C., "Principles of Color Reproduction", pp. 319-326 (1987).

*Primary Examiner*—R. L. Moses
*Attorney, Agent, or Firm*—Fitzpatrick, Cella, Harper & Scinto

[57] ABSTRACT

There is disclosed a color copier or the line in which an original image is separated into plural image signals of different color components, which are repeatedly subjected to a determined signal process to reproduce the original image with an improved image quality and with a simple structure.

21 Claims, 6 Drawing Sheets

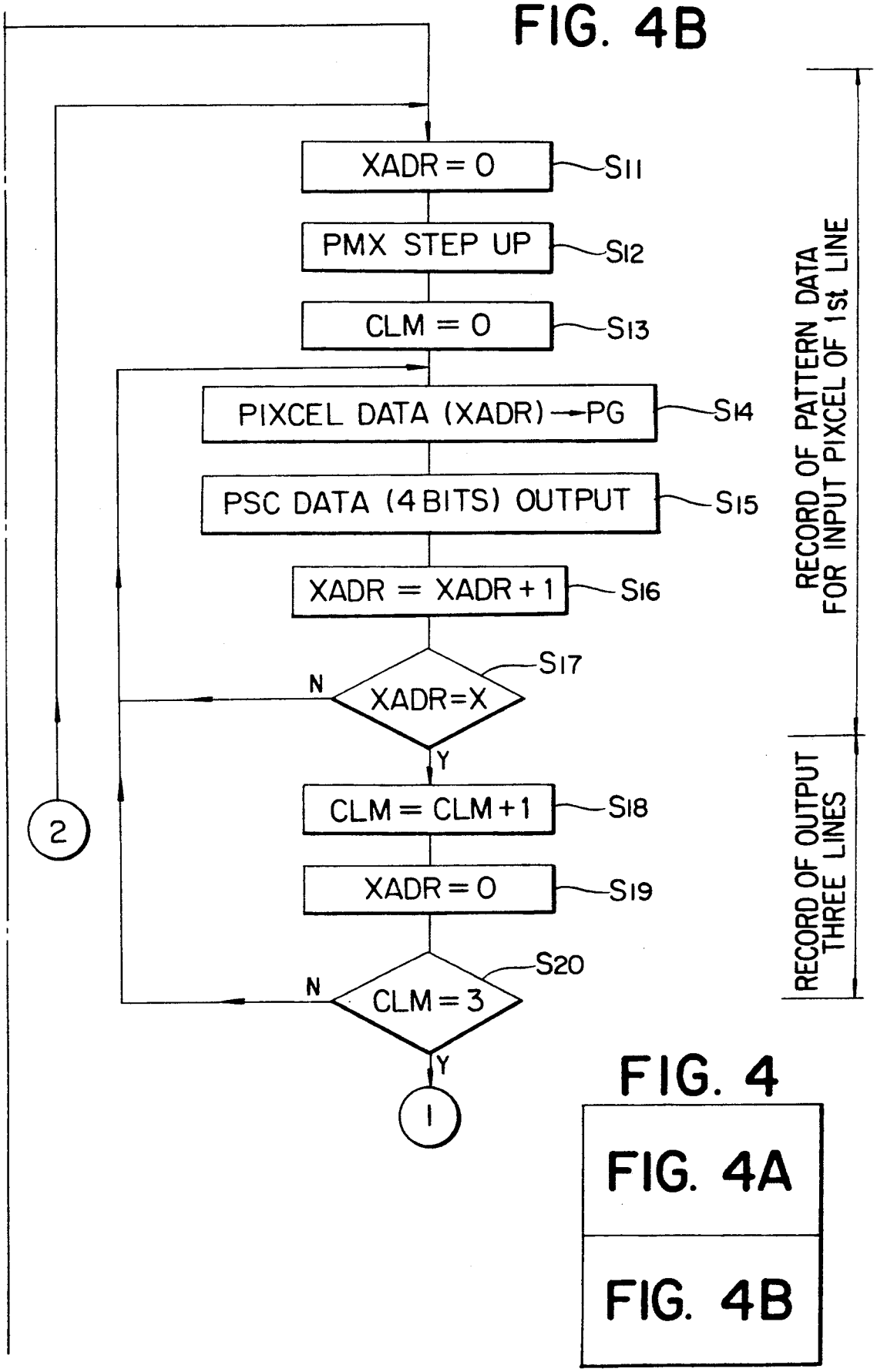

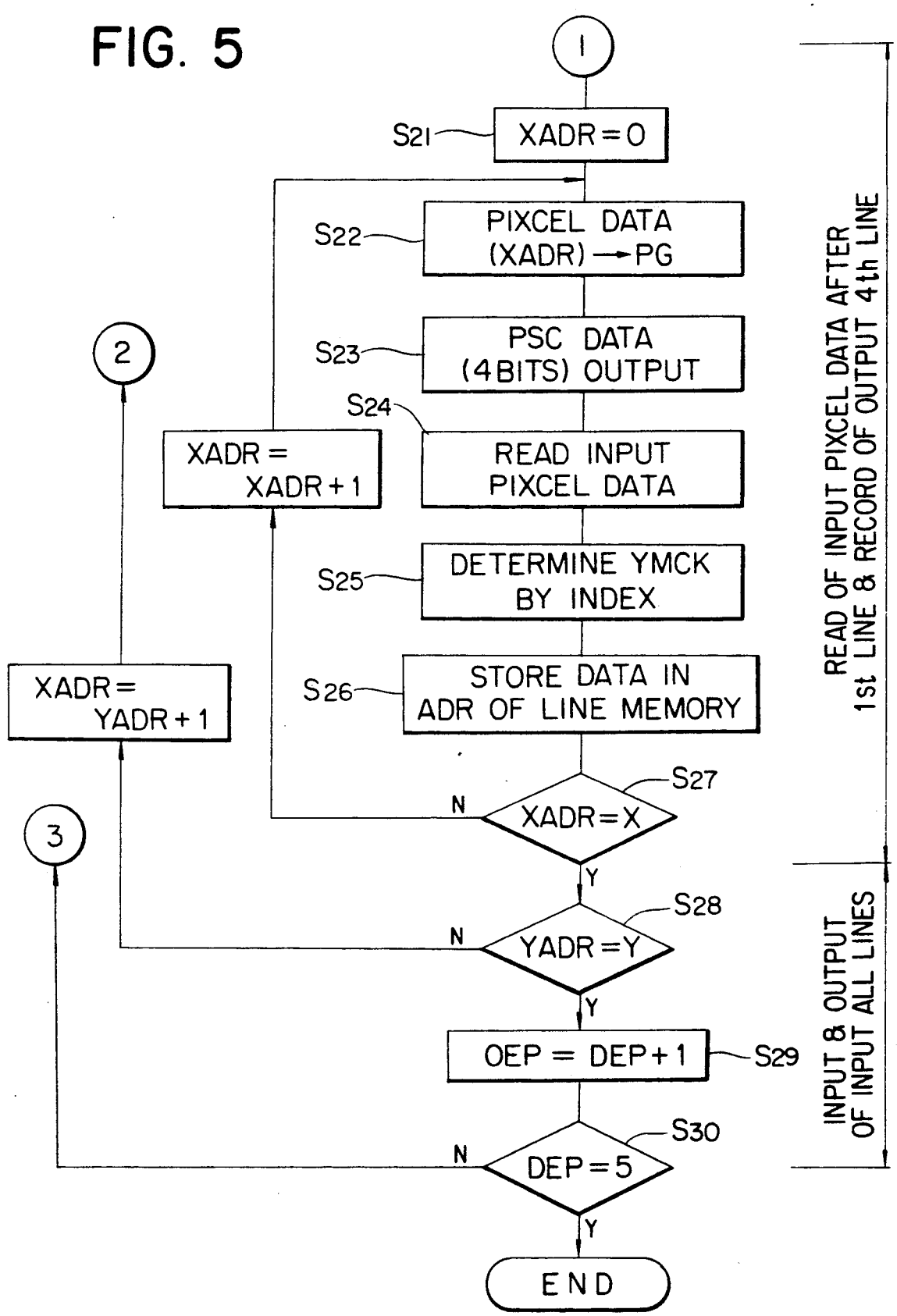

COLOR IMAGE PROCESSING APPARATUS

This application is a continuation of application Ser. No. 880,935 filed Jun. 25, 1986 which is a continuation of application Ser. No. 584,510, filed on Feb. 28, 1984 now abandoned.

BACKGROUND OF THE INVENTION

1. Field of the Invention

The present invention relates to a color image processing apparatus for digital color image processing.

2. Description of the Prior Art

In the field of non-silver color copiers, there have been proposed the following processes:

(1) an electrophotographic process in which the original image is separated through color separation filters to form latent images corresponding to different colors, which are respectively developed into visible images of three different colors and are transferred in registration to reproduce the original image;

(2) an ink jet recording process in which the original is scanned with color separation to obtain color separated signals, which are used, after electric conversion to complimentary colors and eventual color correction, for emitting ink of three or four colors from ink jet nozzles thereby reproducing the color image; and (3) a thermal transfer recording process in which the original is scanned with color separation to transfer color inks through one or more thermal heads thereby reproducing the color image.

The above-mentioned process (1) relies on the analog characteristic of the electrophotographic process for the reproduction of intermediate tones required in the color images and is therefore associated with a considerable fluctuation in the image quality due to circumferential conditions. Such fluctuation is believed to be caused by the direct effect of temperature and humidity on the corona discharge, photosensitive member, etc.

On the other hand, the above-mentioned processes (2) and (3) involve various problems yet to be solved in relation to recording reliability printing speed, printing dot quality, etc.

FIG. 1 shows a conventional color copier manufactured by the present applicant, wherein a drum 1, rotated in a direction of arrow a, is provided, along the periphery thereof, with a photosensitive member composed of a conductive layer, a DcS photoconductive layer and an insulating layer.

An original carriage glass 3 supports an original to be copied. Said original is illuminated by an illuminating lamp 5, and the reflected light is scanned by scanning mirrors 7, 9 which are moved in synchronization with the rotation of the drum 1, and is guided through a lens 11, a mirror 13, a color separator 15, a mirror 17 and a secondary charger 19 for charge elimination simultaneously with exposure to light and is focused onto the photosensitive member of the drum 1.

In this manner a latent image is formed on the photosensitive drum 1.

The color separator 15 comprises a blue filter 15B, a green filter 15G, a red filter 15R and a neutral density (ND) filter 15N, which are suitably changed by rotation to achieve color separation.

The photosensitive member of the drum 1 is cleaned in advance with a blade cleaner 31, and the effect of previous latent image formation is erased by a pre-exposure lamp 33 and a pre-charger 35.

Then, the photosensitive member is uniformly charged with a primary charger 37 to obtain a uniform surface potential. Subsequently the photosensitive member is subjected to charge elimination by the secondary charger 19 simultaneously with exposure to the light from the original, and is then exposed uniformly to the light from a flush exposure lamp 39, thereby forming an electrostatic latent image of an elevated contrast on said photosensitive member.

In the vicinity of the drum 1 and between the flush exposure lamp 39 and a developing station 41 there is provided a potential probe 43 for detecting the electrostatic potential, or the intensity of the latent image.

The developing station 41 is composed of a yellow developing unit 41Y, a magenta developing unit 41M, a cyan developing unit 41C and a black developing unit 41B, which develop the latent image with toners of respective colors.

A recording sheet 51 stored in a cassette is supplied by a feeding roller 53 to a transfer station 55, where the sheet 51 is gripped at the leading end by a gripper 57 and the developed image on the photosensitive member of the drum 1 is transferred onto said sheet by means of corona discharge applied on the opposite face of said sheet from a transfer charger 59.

In the case of single-color copying, the recording sheet 51 is separated from the transfer station 55 by a separating claw 63 after the charge is eliminated by a separating charge eliminater 61.

On the other hand, in case of multi-color copying, the gripper 57 of the transfer station 55 is not released and the separating claw 63 does not operate so that the recording sheet 51 is retained, until the transfer of plural color images is completed.

Upon completion of the transfer, the separating claw 63 is activated to separate the recording sheet 51 from the transfer station 55, and said sheet is forwarded by a conveyor belt 65 to a fixing station 67 with heating rollers for image fixation.

The recording sheet 51 after image fixation is discharged into a tray 69. On the other hand, the drum 1 is cleaned, after image transfer, with the blade cleaner 31 for removing the remaining toner, and enters the succeeding copying cycle.

In the above-described structure in which the steps of original reading to latent image formation is conducted through a two-dimensional optical system, it is not possible to apply a particular process to each dot of the image, for example an imaging process such as masking to each dot in relation to the spectral characteristic of toners. For this reason the image quality of the reproduced color image is limited.

Also the reproduction of intermediate tones, indispensable in colored images, is achieved by regulating the surface potential on the photosensitive member in response to the intensity of light reflected from the original, thus modulating the amount of toner deposition in the developing step.

Consequently the image quality is apt to fluctuate, depending on the circumferential conditions.

There is also known a process in which the light reflected from an original is read, after color separation, with an image sensor such as a charge-coupled device (CCD), and the image is reproduced with suitable recording means such as lasers after performing determined image processing.

In such image processing, in order to control the deposition of toners of three or four colors in consideration of the entered color components of red, green and blue and of the colors of the toners to be employed, it is essential to know the magnitude of three color signals of each dot on the original.

For this purpose, there may be considered a structure of for scanning the original three times with color separation to store the image signals of different colors in an image memory and reading said image signals thereafter to calculate the amount of toners. Such structure not only requires a longer time for color separation, but also is disadvantageous if an image memory of high cost is employed, since, in case of copying an original of A3 size with a resolution of 10 lines/mm, there will be required a memory of 394 mm×420 mm×10 lines/mm×10 lines/mm×3 colors×6 bits/dot=2979 Mbits=37.2 Mbytes.

The memory capacity may be reduced by recording images of different colors simultaneously on different drums, but such structure will inevitably lead to a bulky and complicated apparatus since three to four drums are required for a full-color copying.

SUMMARY OF THE INVENTION

In consideration of the foregoing, an object of the present invention is to provide a color image processing apparatus capable of color image processing with a simple structure.

Another object of the present invention is to provide a color image processing apparatus with improved color reproducing capability.

Still another object of the present invention is to provide a color image processing apparatus not requiring a memory of a large capacity.

Still another object of the present invention is to provide a color image processing apparatus capable of reproducing a color image of high image quality without loss in the recording speed.

The foregoing and still other objects of the present invention will become fully apparent from the following description.

BRIEF DESCRIPTION OF THE DRAWINGS

FIGS. 4, 4a, 4b, and 5 are flow charts showing the control function of the control unit shown in FIG. 3A.

DETAILED DESCRIPTION OF A PREFERRED EMBODIMENT

Now the present invention will be explained in detail by an embodiment thereof shown in the attached drawings.

Figure 1:
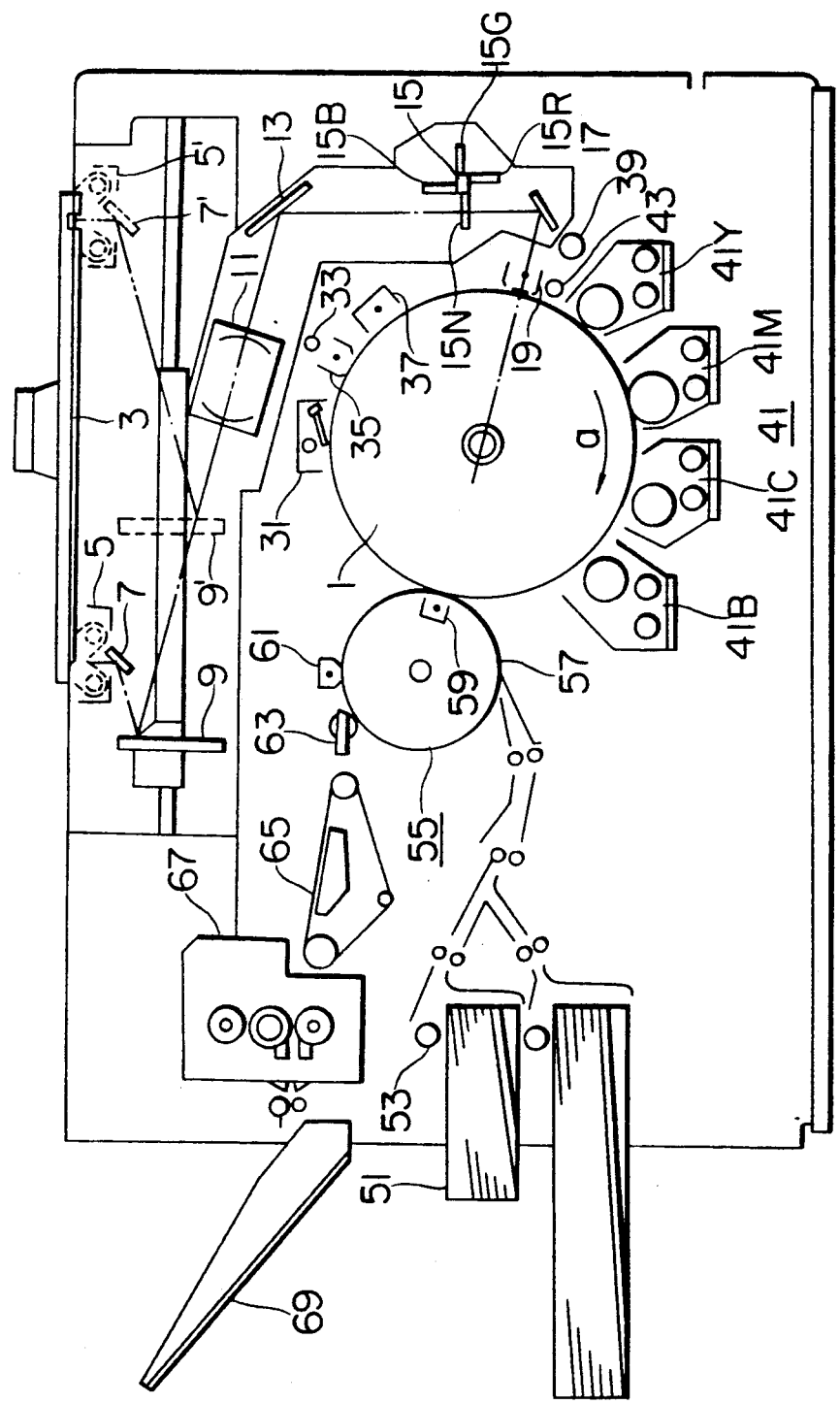
FIG. 1 is a cross-sectional view of a conventional color copier.
Figure 2:
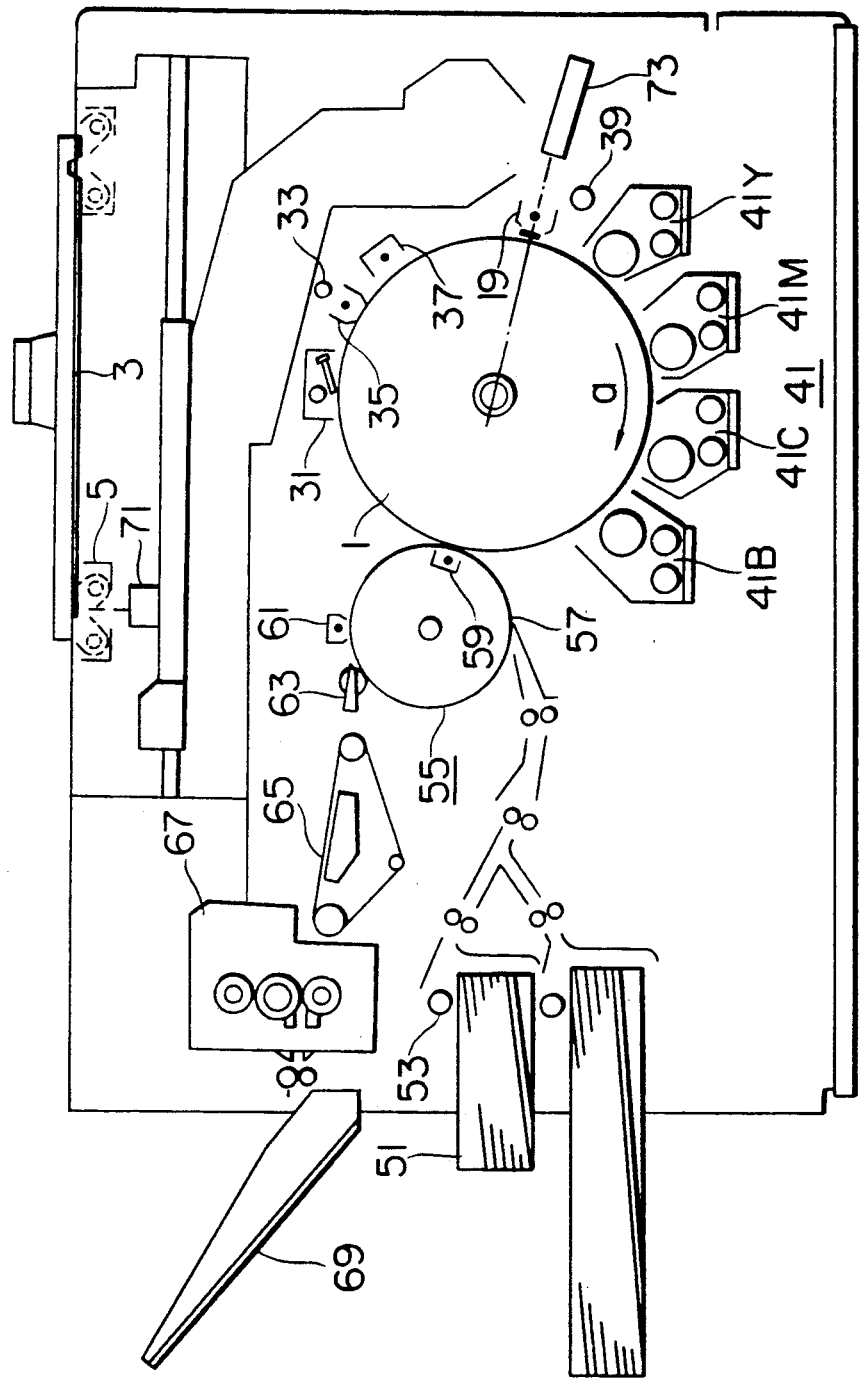
FIG. 2 is a cross-sectional view of a color copier embodying the present invention.

FIG. 2 and ensuing drawings illustrate an embodiment of the present invention, wherein FIG. 2 shows the schematic structure of a color copier embodying the present invention, in which the same components as those in FIG. 1 are represented by the same numbers and are omitted from further explanation.

In the present embodiment, an input unit 71, for original reading and for three-color simultaneous color separation, moves integrally with the illuminating lamp 5.

Said input unit 71 is composed, for example, of dichroic prisms and three CCD linear sensors for color separating a line on the original. Consequently the three-color separation is achieved by a single scanning of the original, and the thus separated images are simultaneously read by the CCD's to provide color signals R, G, B from the unit 71.

On the other hand, a recording unit 73 comprises a semiconductor laser and a light dot scanner.

Said input unit 71 and recording unit 73 are connected by an image processing unit of which structure is schematically shown in FIG. 3.

Figure 3A:
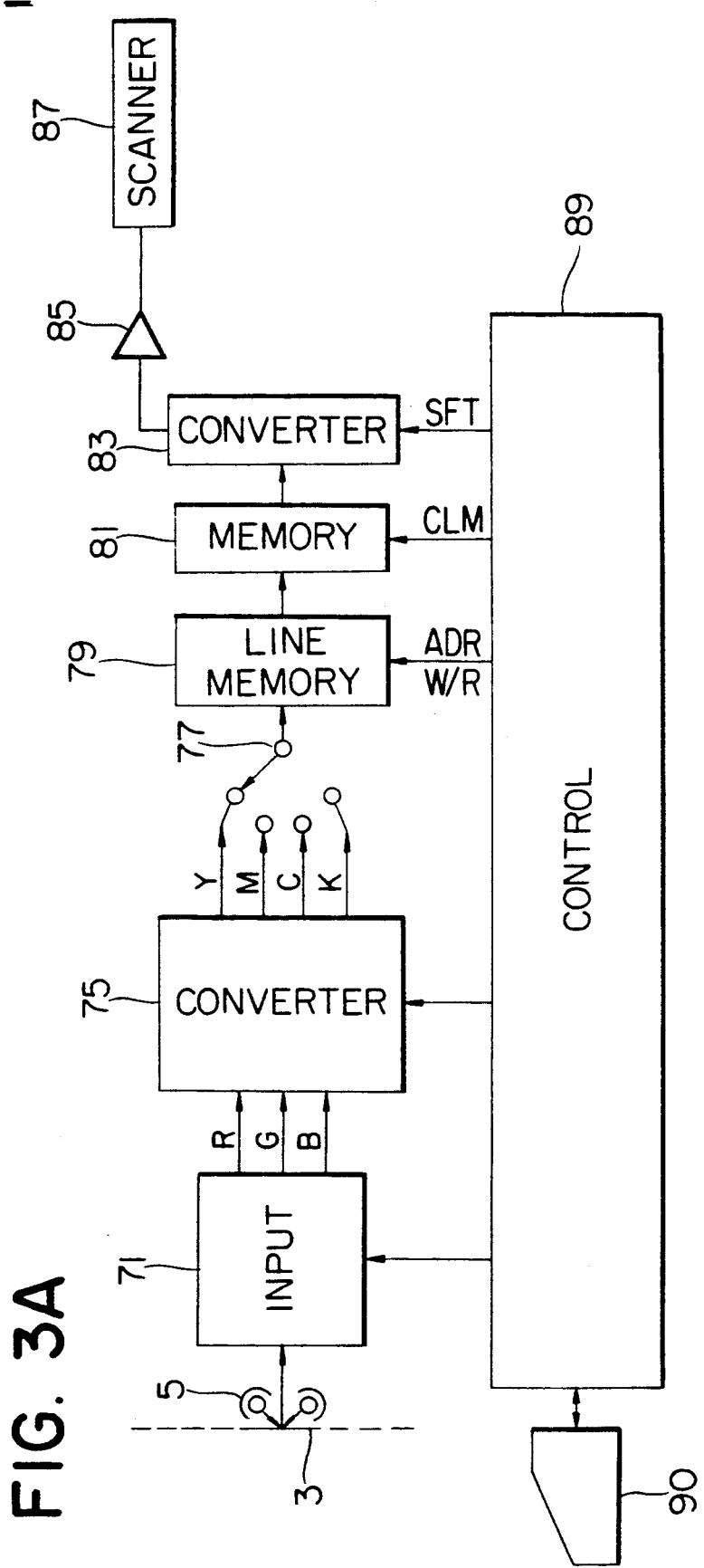
FIG. 3A is a block diagram of a control unit for use in the color copier shown in FIG. 2.

In FIG. 3A, a signal converter 75 provides signals of yellow (Y), magenta (M), cyan (C) and black (K) required for copying, in response to three input color signals of red (R), green (G) and blue (B) supplied from the input unit 71.

The output signals from said signal converter 75 are supplied, through a selector 77, to a line memory 79 for storing the image signals of a color in a line.

Said line memory 79 is required for the following reason. As an example, in case a pixel is composed of 4×4 dots, a line on the original can be copied only after printing 4 lines in the matrix pattern. It therefore becomes necessary to make access four times, in copying a line on the original, to the image signals stored in the line memory.

The output signals from the line memory 79 are supplied to a memory 81 which stores 17 pattern data formed by 4×4 dots corresponding to the density data processed in the signal converter 75 and functions as a pattern generator.

Figure 3B:
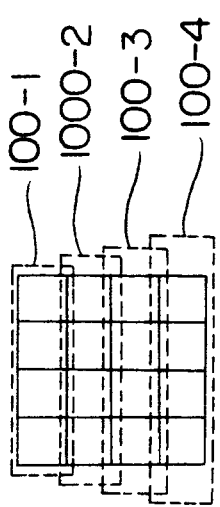
FIG. 3B is a schematic chart showing the matrix pattener of a pixel.

The output signals from memory 81 are supplied to a signal converter 83, which converts 4-bit parallel signals, as shown by 100-1-100-4 in FIG. 3B selected from the 17 patterns stored in the memory 81, into serial signals.

Said signal converter 83 is connected, through a driver 85, to a laser and a dot scanner 87, constituting the recording unit 73.

The above-described components are controlled by a control unit 89.

An operation unit 90 is provided with a copy key, copy number setting keys etc., and may also be utilized for entering a conversion constant, masking constant, etc. to be explained later. The control unit is provided with a memory for storing a program and a microcomputer for executing said program.

The present embodiment, being provided with only one drum and with a simple line memory, requires plural scanning operations corresponding to the number of colors employed in the color image.

More specifically, in case of four-color copying, there are required four scanning operations corresponding to the colors Y, M, C and K. Likewise there will be required three scanning operations for a three-color copying. Naturally a scanning operation with simultaneous color separation can be employed if the color signals B, G, R are stored in three page memories.

In the following there is explained the copying operation with the present embodiment.

In case of generating the yellow signals in the first original scanning, the image signals obtained from the input unit 71 are converted by the signal converter 75 into the color component signals Y, M, C, K required in the four-color copying, and the selector 77 is so positioned as to extract the signal Y alone, thereby storing the image signals of component Y of a line in the line memory 79.

The control unit 89 supplies address data ADR and read-write signals W/R to the line memory 79 to store the component signals Y in succession at addresses corresponding to the pixel positions.

More specifically, the component signal Y at the 1st pixel on a first line of the original is stored in an address "0", and that of 2nd pixel is stored in an address "1".

The component signals Y are thereafter stored in the line memory in a similar manner, and in case a line of 210 mm for an A4-sized original is read with a resolution of 10 lines/mm, the last pixel of the 1st line is stored in an address "2099".

The above-mentioned data 2100 pixels all represent density of the yellow component of the original.

Upon completion of the storage of signals of 2100 pixels into the line memory 79, the address signal ADR returns to zero, thereby starting to read the content of the line memory 79 four times for copying.

The signals are read, starting from the 1st pixel in the first line at ADR=0, and supplied to the intermediate tone memory 81 to select the 4×4 dot matrix pattern corresponding to the density of the image signal.

On the other hand, the control unit 89 releases a row selecting signal CLM to select either one of the rows 100-1-100-4 of the 4×4 matrix shown in FIG. 3B.

The signal CLM is at first equal to zero to select 4 dots in a row 100-1 shown in FIG. 3B.

The 4-bit signals, thus obtained, are latched in the signal converter 83, converted into serial signals by shift pulses SFT supplied from the control unit 89 and supplied through the driver 85 to the scanner 87 for modulating the laser beam.

In this manner, the recording of four dots at the first row, in the first yellow pixel on the first line on the original is achieved.

Then, the signal ADR is shifted to "2" to select the second pixel signal in the line memory 79, whereby achieved is the recording of four dots at the first row in the second yellow pixel on the first line on the original.

The above-described operation is repeated until the completion of recording of 2100 pixels, of 8400 dots in the first column, whereupon the signal ADR returns to zero and the signal CLM is shifted to "1" to select a row 100-2 shown in FIG. 3B.

In this manner intermediate tone reproduction is achieved by binary recording, through making reference four times to the original signals stored in the line memory.

Upon formation of a latent image in this manner corresponding to yellow color, the latent image is developed into a visible image and transferred onto the recording sheet. Thereafter, the selector 77 is shifted to a position corresponding to the magenta color M to initiate a magenta latent image formation.

In this step the input unit 71 again scans the original to obtain color-separated signals as explained in the foregoing, but the magenta component signals alone of a line are supplied to the line memory 79 from the signal converter 75.

The recording operation in this case is identical to the preceding step.

In practice, however, it becomes necessary, for the purpose of improving the image processing speed, to conduct the signal input and output simultaneously starting from the signal input for the second line in latent image formation of each color.

For this purpose, the line memory 79 is composed of two line buffer memories which respectively store the odd columns and even columns in the matrix pattern signals.

More specifically, a first line buffer memory handles the input and output of the first and third columns in the 4×4 dot matrix pattern, while a second line buffer memory handles those of the second and fourth columns.

Thereafter, the copying of cyan and black images is conducted in the same manner to complete color reproduction of the original.

As explained in the foregoing, the three-color separation is conducted at every original scanning, and the pixel signals Y, M, C, K obtained from the color-separated signals are selectively stored in a line memory and subjected to plural accesses. This process allows to reproduce an original pixel in 17 levels represented by 4×4 dots.

The above-described structure does not require an enormous memory capacity for image processing but only requires a memory for table conversion in the signal converter 75.

Said signal converter 75 supplies the line memory 79 with the signals obtained by $\gamma$-conversion and masking conversion in response to the input signals R, G, B and the signal write-in and read-out of said line memory are controlled by the control unit 89.

Consequently, the processing time required for the table conversion in the signal converter 75 is extremely short, so that a real-time processing is sufficiently possible in consideration of the ordinary electrophotographic processing speed.

The $\gamma$-conversion mentioned above indicates a correction for the non-linear input-output relationship in order to achieve faithful image reproduction.

Also, the masking conversion indicates a correction on the image signals of a particular color in relation to the image signals of other colors, for the purpose of achieving adequate color reproduction.

Also, the table conversion means a process of storing appropriate output signals in a memory such as a random access memory, and reading said output signals from said memory in response to the input image signals.

Now reference is made to FIGS. 4 and 5 for explaining the sequence of copying operation. Upon starting the copying operation, a step S1 enters a $\gamma$-conversion constant into the control unit 89. Then a step S2 enters a masking constant, and, in a step S3, the control unit 89 determines the values of the $\gamma$-conversion table and of the masking conversion table from the above-mentioned constants and supplies said values to the signal converter 75.

Then a step S4 clears a selecting counter DEP for the selector 77 and for the developing unit 41.

A step S5 selects the position of the selector 77 and either one of the developing units Y, M, C, K according to the content of the counter DEP. Then a step S6 resets the address XADR of the line memory for the main scanning direction (X-direction) and the address YADR of the line memory for the subsidiary scanning direction (Y-direction). Subsequently a step S7 initiates the image signal reading from the input unit 71, and a step S8 selects one of the colors Y, M, C, K from a table.

In this manner, the pixel signals of the thus selected color are stored in the line memory 79. A step S10 discriminates whether the number of pixel signals stored in the line memory has reached the predetermined number X of pixels, which is 2099 in the present embodiment, and the address XADR is stepwise increased until said number X is reached.

The reading of a line of the pixel signals of a color is completed when said number X is reached, and the recording operation is initiated. Thus, a step S11 clears the address XADR of the line memory, and a step S12 causes the stepwise rotation of a motor PMX for driving the input unit.

Subsequently in a step S13, the control unit 89 supplies the memory 81 with the column selecting signal CLM for the 4×4 matrix pattern constituting each pixel. In the initial state said signal CLM is equal to zero.

A step S14 subsequently supplies the pattern generator with the pixel signal corresponding to the address XADR, and, in a step S16, the signal converter 83 releases 4-bit serial signals obtained from the parallel-to-serial converter PSC in synchronization with the main scanning clock pulses for recording on the photosensitive drum.

In this manner the recording of the pixel signal stored at the address "0" in the line memory 79 is achieved, and a succeeding step S16 effect a stepwise increment of the address XADR.

Then, the program proceeds to a step S17 to repeat the above-described recording step until the predetermined number X of the pixels is reached. When said number X is reached, the program proceeds to a step S18 to stepwise increase the column selecting signal CLM, thereby starting the recording of the second column of the 4×4 matrix pattern already stored in the other buffer memory. The recording operation is effected, as explained above, from an address XADR=0 in a step S19, and is repeated until the signal CLM reaches "3" in a step S20, whereupon the recording for the third column of the 4×4 matrix pattern is conducted.

Then, the program proceeds as shown in FIG. 5, in order to simultaneously effect the recording of the fourth column of the 4×4 dot matrix pattern for the first line of the original and the signal reading of the pixel signals of the second line of the original.

More specifically, a step S21 resets the address XADR of the line memory 79, then a step S22 releases a pixel signal indicated by said address to the pattern generator, and a step S23 releases 4-bit serial signals, obtained in the parallel-to-serial converter PSC, in synchronization with the main scanning clock signals.

A subsequent step S24 effects the reading of the pixel signals of the second or subsequent line from the input unit 71, and a step S25 selected one of the colors Y, M, C, K from a table. Then a step S26 stores the signals of thus selected color into the line memory 79.

A step S27 discriminates whether the number of stored pixel signals has reached a predetermined number X, and the procedure starting from the abovementioned step S22 is repeated until said number X is reached.

During the above-descrived procedure, there is conducted the recording of the fourth column of the 4×4 matrix pattern.

In this manner the recording of a line for a color, for example yellow color, is completed. Then the program proceeds to a step S28 to identify whether the line memory address YADR for the subsidiary scanning direction has reached a predetermined number Y of scanning lines on the original.

If said number Y is not yet reached, the program returns to the step S11 shown in FIG. 4 to repeat the above-described procedure. On the other hand, if said number Y is reached, indicating the completion of entire yellow signal recording, the program proceeds to a step S29 to stepwise advance the selecting counter DEP for the selector 77 and for the developing station 41, thereby initiating the image formation of another color, for example magenta M. Then the program proceeds to a step S30 to identify if the content of the counter DEP is equal to "5", and, if not, there is repeated the procedure starting from the step S5 shown in FIG. 4.

In this manner the magenta color image is formed.

Thereafter the above-described procedure is repeated for the remaining colors, i.e. cyan (C) and black K. On the other hand, if the step S30 identifies that the content of the counter DEP is equal to "5", indicating the completion of all the color images, the copying operation for the given original is terminated.

In this manner, the color copying operation can be conducted without the use of a large memory.

Although the foregoing embodiment has been concentrated on the electrophotographic process, it will be evident that the present invention is applicable also to any other color recording apparatus such as ink jet recording or thermal recording apparatus.

Also, the line memory may be composed of three or more memories. Also each pixel need not necessarily be composed of 4×4 dots but can be arbitrarily selected from 1×1 to 1×n dots.

Furthermore, the signal converter 75 may be provided with an already known dither adding circuit for data compression, thereby reducing the capacity of the line memory 79.

In the foregoing embodiment, the recording is achieved by digitized binary recording, but the present invention may also be applied to an analog process for modulating the energy of the laser in response to the content of the line memory, thereby adding an image processing function to a conventional analog color copier.

The aforementioned color-separated signals B, G, R may be originated for example from a memory of a host computer. Furthermore, the recording need not necessarily be made on a recording sheet but can be filed for example in a memory disk.

What I claim is:

1. A color image processing apparatus comprising:
reading means for reading image information by simultaneously separating light reflected from an original into plural color component signals;
converting means for converting the plural color component signals into recording color data signals;
image recording means responsive to the recording color data signals for serially recording an image on a recording member; and
control means for causing the reading operation of said reading means and the conversion operation of said converting means to be repeated a number of times corresponding to the number of recording data color signals;
wherein said converting means comprises means for correcting non-linear input-output relationship and memory means for storing correction data in advance corresponding to input data, and is adapted to effect said correction by making access to said memory means in response to said color-separated signals.

2. A color image processing apparatus comprising:

data output means for simultaneously releasing data of plural colors;

correcting means for correcting data of a particular color among said plural data released from said data output means, in response to data of other colors; and image reproducing means for reproducing a color image by repeating image reproduction on a recording member in response to the color data corrected by said correcting means;

wherein said correction by said correcting means and said image reproduction by said image reproducing means are conducted in parallel manner, and wherein said correcting means comprises memory means for storing correction data in advance corresponding to the entered color data and is adapted to effect said correction by making access to said memory means in response to said color data.

3. A color image processing apparatus comprising:

reading means for reading image information by simultaneously separating light reflected from an original into plural color component signals;

converting means for converting the plural color component signals into recording color data signals;

image recording means responsive to the recording color data signals for serially recording an image on a recording member; and control means for causing the reading operation of said reading means and the conversion operation of said converting means to be repeated a number of times corresponding to the number of recording data color signals;

wherein said converting means comprises means for correcting a particular color data in response to other color data and memory means for storing correction data in advance corresponding to input data, and is adapted to effect said correction by making access to said memory means in response to said color-separated signals.

4. A color image processing apparatus according to claim 1 or 3, wherein said recording means comprises;

means for forming a latent image on said recording member;

plural developing means for developing said latent image; and transfer means for transferring the developed image onto a transfer material;

wherein said recording means is adapted to record a color image by forming a latent image corresponding to a first color data on said recording member, transferring said image, after development with first developing means, into the transfer material by means of the transfer means, then forming a latent image corresponding to second color data obtained by said process on said recording member, and transferring said image, after development with second developing means, onto said transfer material by said transfer means, and wherein said recording member is a photosensitive member.

5. A color image processing apparatus according to claim 3, wherein said image recording means comprises;

means for forming a latent image on said recording member;

plural developing means for developing said latent image; and transfer means for transferring the developed image onto a transfer material.

6. A color image processing apparatus according to claim 5, wherein said recording means is adapted to record a color image by forming a latent image corresponding to a first color data on said recording member, transferring said image, after development with first developing means, into the transfer material by means of the transfer means, then forming a latent image corresponding to second color data obtained by said process on said recording member, and transferring said image, after development with second developing means, onto said transfer material by said transfer means.

7. A color image processing apparatus according to claim 5, wherein said transfer means comprises holding means for holding said transfer material.

8. A color image processing apparatus according to claim 5, wherein said recording member is a photosensitive member.

9. A color image processing apparatus according to claim 3, wherein said image reading means comprises dichroic mirrors for separating the light from the original into plural color components; filters corresponding to said plural color components; and charge-coupled devices for receiving thus separated color components.

10. A color image processing apparatus according to claim 3, wherein said converting means converts the plural color component signals into a respective recording color data signal for each of plural recording colors.

11. A color image processing apparatus comprising:

image reading means for reading image information by simultaneously separating light which is from an original into plural color component signals;

correcting means for performing color correction by using the plural color component signals so as to obtain a respective recording color data signal for each color;

storing means for temporarily storing a part of at least one of the recording color data signals obtained by the correcting means;

image recording means for sequentially recording on a recording member in accordance with the recording color data signal stored in said storing means; and controlling means for causing the reading operation of the reading means and the correcting operation of said correcting means to be repeated a number of times corresponding to the number of recording colors.

12. A color image processing apparatus according to claim 11, wherein said image reading means comprises:

dichroic mirrors for separating the light from the original into plural color components;

filters corresponding to said plural color components; and charge-coupled devices for receiving thus separated color components.

13. A color image processing apparatus according to claim 11, wherein said image recording means comprises:

means for forming a latent image on said recording member;

plural developing means for developing said latent image; and transfer means for transferring the developed image onto a transfer material.

14. A color image processing apparatus according to claim 13, wherein said image recording means is adapted to record a color image by forming a latent image corresponding to a first color data on said recording member, transferring said image, after development with first developing means, into the transfer material by means of the transfer means, then forming a latent image corresponding to second color data obtained by said process on said recording member, and transferring said image, after development with second developing means, onto said transfer material by said transfer means.

15. A color image processing apparatus according to claim 14, wherein said transfer means comprises holding means for holding said transfer material.

16. A color image processing apparatus according to claim 13 or 13, wherein said recording member is a photosensitive member.

17. A color image processing apparatus according to claim 13, wherein said latent image forming means comprises:
   means for generating a laser beam; and
   means for modulating the laser beam in response to said recording color data signal.

18. A color image processing apparatus according to claim 11, wherein said correcting means comprises memory means for storing correction data and is adapted to effect said correction by making access to said memory means in response to said plural color component signals.

19. A color image forming method comprising the steps of:
   simultaneously generating plural color component signals;
   forming plural recording color signals in response to the plural color component signals;
   sequentially outputting the plural recording color signals formed in said forming step;
   providing plural color image forming means which respectively correspond to plural colors represented by the recording color signals output in said outputting step;
   sequentially enabling the plural color image forming means; and
   recording a color image causing the plural recording color signals output in said outputting step to sequentially and continuously correspond to the respective color image forming means enabled in said enabling step,
   wherein, in said forming step, the plural color component signals are used as addresses, and the recording color signals are formed by accessing a memory which generates the recording color signal as output data.

20. A color image forming apparatus comprising:
   data output means for simultaneously releasing data of plural color component signals:
   color signal processing means including color correction means which forms plural recording color signals in response to the plural color component signals, said color signal processing means sequentially outputting the respective recording color signals;
   color image reproducing means for reproducing a color image in response to the plural recording color signals, said color image reproducing means including plural color image forming means which respectively correspond to the plural recording color signals, and said plural color image forming means being sequentially enabled; and
   controlling means for controlling such that the plural recording color signals output by said color signal processing means sequentially and continuously correspond to the respective plural color image forming means,
   wherein said color signal processing means comprises memory means for storing corrected signals in advance corresponding to input data, and is adapted to effect said correction by making access to said memory means in response to the color component signals.

21. A color image forming apparatus comprising:
   data output means for simultaneously releasing data of plural color component signals,
   color signal processing means including color correction means which forms plural recording color signals in response to the plural color component signals, said color signal processing means sequentially outputting the respective recording color signals;
   color image reproducing means for reproducing a color image in response to the plural recording color signals, said color image reproducing means including plural color image forming means which respectively correspond to the plural recording color signals, and said plural color image forming means being sequentially enabled;
   controlling means for controlling such that the plural recording color signals output by said color signal processing means sequentially and continuously correspond to the respective plural color image forming means,
   wherein said color signal processing means comprises memory means for storing corrected signals in advance corresponding to input data, and is adapted to effect said correction by making access to said memory means in response to the color component signals and
   wherein said data output means and said color correction means operate a number of time equal to a number of operations of said color image forming means.

* * * * *

UNITED STATES PATENT AND TRADEMARK OFFICE
CERTIFICATE OF CORRECTION

PATENT NO. : 5,126,839

DATED : June 30, 1992

INVENTOR(S) : SUSUMU SUGIURA

Page 1 of 3

It is certified that error appears in the above-identified patent and that said Letters Patent is hereby corrected as shown below:

ON THE TITLE PAGE:

IN [56] REFERENCES CITED

Under FOREIGN PATENT DOCUMENTS,
"1294536  12/1978  United Kingdom" should read
--1294536  11/1972  United Kingdom--.

IN [57] ABSTRACT

Line 1, "line" should read --like--.

SHEET 4 OF 6

Figure 4A:
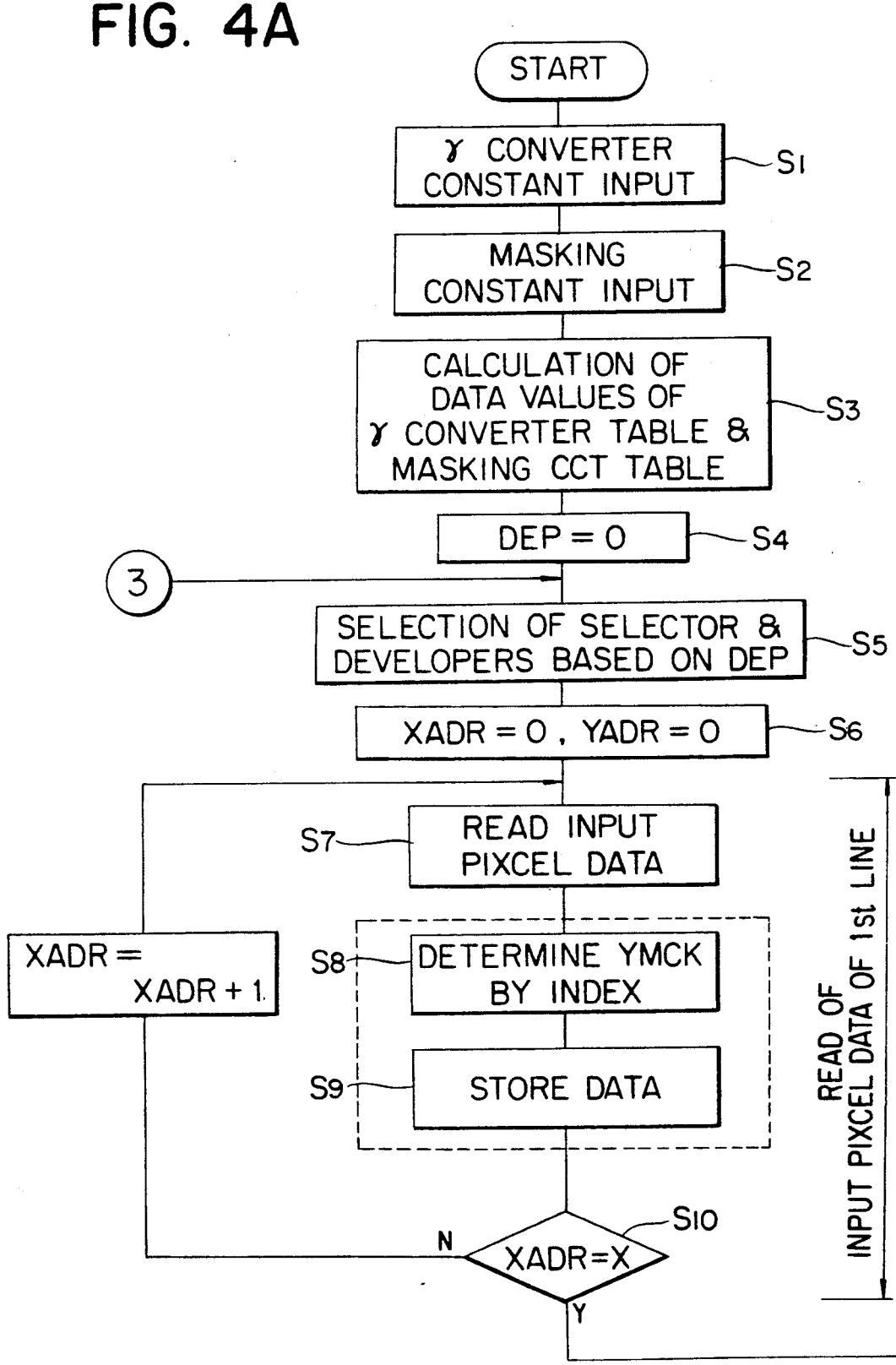

FIG. 4A, "PIXCEL" (both occurrences) should read --PIXEL--.

SHEET 5 OF 6

FIG. 4B, "PIXCEL" (both occurrences) should read --PIXEL--.

SHEET 6 OF 6

FIG. 5, "PIXCEL" (all occurrences) should read --PIXEL--.

COLUMN 2

Line 3, "Subsequently" should read --Subsequently,--.
Line 53, "Also" should read --Also,--.
Line 59, "Consequently" should read --Consequently,--.

COLUMN 3

Line 6, "of" should be deleted.

UNITED STATES PATENT AND TRADEMARK OFFICE
CERTIFICATE OF CORRECTION

PATENT NO. : 5,126,839
DATED : June 30, 1992
INVENTOR(S) : SUSUMU SUGIURA

It is certified that error appears in the above-identified patent and that said Letters Patent is hereby corrected as shown below:

COLUMN 4

Line 58, "Naturally" should read --Naturally,--.
Line 61, "In the following" should read
--In the following,--.

COLUMN 7

Line 11, "Subsequently" should read --Subsequently,--.

COLUMN 8

Line 17, "black K." should read --black (K).--.

COLUMN 9

Line 66, "claim 3," should read --claim 1 or 3,--.

COLUMN 10

Line 17, "claim 5," should read --claim 6,--.
Line 23, "claim 3," should read --claim 1 or 3,--.
Line 29, "claim 3," should read --claim 1 or 3,--.

COLUMN 11

Line 18, "claim 13 or 13," should read --claim 13 or 14,--.

UNITED STATES PATENT AND TRADEMARK OFFICE
CERTIFICATE OF CORRECTION

PATENT NO. : 5,126,839

DATED : June 30, 1992

INVENTOR(S) : SUSUMU SUGIURA

It is certified that error appears in the above-identified patent and that said Letters Patent is hereby corrected as shown below:

<u>COLUMN 12</u>

Line 2, "signals:" should read --signals;--.
   Line 53, "signals" should read --signals,--.

Signed and Sealed this

Twenty-first Day of September, 1993

Attest:

BRUCE LEHMAN

*Attesting Officer*     *Commissioner of Patents and Trademarks*